(12) United States Patent
Ram

(10) Patent No.: US 11,462,030 B2
(45) Date of Patent: Oct. 4, 2022

(54) METHOD AND SYSTEM FOR DETECTING A PILE

(71) Applicant: Caterpillar Inc., Peoria, IL (US)

(72) Inventor: Shastri Ram, Pittsburgh, PA (US)

(73) Assignee: Caterpillar Inc., Peoria, IL (US)

(*) Notice: Subject to any disclaimer, the term of this patent is extended or adjusted under 35 U.S.C. 154(b) by 22 days.

(21) Appl. No.: 16/871,419

(22) Filed: May 11, 2020

(65) Prior Publication Data
US 2021/0350114 A1 Nov. 11, 2021

(51) Int. Cl.
G06V 20/64 (2022.01)
G06T 7/80 (2017.01)
G06T 7/60 (2017.01)
G06K 9/62 (2022.01)
G06T 7/50 (2017.01)
(Continued)

(52) U.S. Cl.
CPC .......... G06V 20/647 (2022.01); G01S 7/4802 (2013.01); G01S 17/42 (2013.01); G01S 17/931 (2020.01); G06K 9/622 (2013.01); G06K 9/6215 (2013.01); G06K 9/6256 (2013.01); G06K 9/6261 (2013.01); G06T 7/50 (2017.01); G06T 7/60 (2013.01); G06T 7/80 (2017.01); G06V 10/758 (2022.01); G06V 20/56 (2022.01); G06T 2207/10012 (2013.01); G06T 2207/10028 (2013.01); G06T 2207/20081 (2013.01);
(Continued)

(58) Field of Classification Search
CPC ............. G06K 9/00208; G06K 9/6256; G06K 9/6212; G06K 9/6261; G06K 9/622; G06K 9/6215; G06K 9/00791; G01S 17/42; G01S 7/4802; G01S 17/931; G06T 7/80; G06T 7/50; G06T 7/60; G06T 2207/20081; G06T 2207/30252; G06T 2207/10028; G06T 2207/20084; G06T 2207/10012
See application file for complete search history.

(56) References Cited

U.S. PATENT DOCUMENTS 9,222,771 B2 12/2015 Rosengaus et al.
9,587,369 B2 3/2017 Fletcher et al.
(Continued)

FOREIGN PATENT DOCUMENTS

CN 110053943 A 7/2019
WO 2018201180 A1 11/2018

*Primary Examiner* — Christopher M Brandt
(74) *Attorney, Agent, or Firm* — Bookoff McAndrews PLLC

(57) ABSTRACT

A system and a method for detecting a pile of material by an autonomous machine. A 3D point cloud method includes obtaining a 3D point cloud indicative of an environment having a material pile, performing a ground surface estimation on the point cloud to identify non-ground points, grouping the non-ground points into clusters based on a proximity metric, creating a normalized height histogram for each of the clusters, comparing the normalized height histogram of each cluster to a generalized pile histogram, and identifying a cluster as a pile based on the similarity between the normalized height histogram and the generalized pile histogram. A 2D image method includes obtaining a 2D image from an imaging device, calibrating the imaging device with respect to a coordinate frame of the machine, and autonomously detecting an image of a material pile in the two-dimensional image using a trained deep-learning neural network.

20 Claims, 6 Drawing Sheets

(51) Int. Cl.
*G01S 17/42* (2006.01)
*G01S 7/48* (2006.01)
*G01S 17/931* (2020.01)
*G06V 10/75* (2022.01)
*G06V 20/56* (2022.01)

(52) U.S. Cl.
CPC .............. *G06T 2207/20084* (2013.01); *G06T 2207/30252* (2013.01)

(56) References Cited

U.S. PATENT DOCUMENTS

| | | | |
|---|---|---|---|
| 9,702,115 | B1 | 7/2017 | Darukhanavala |
| 2004/0208365 | A1* | 10/2004 | Loui .................... G06K 9/6218 382/171 |
| 2013/0096873 | A1* | 4/2013 | Rosengaus ........... G01C 15/002 702/151 |
| 2016/0300351 | A1* | 10/2016 | Gazit ...................... G06T 7/187 |
| 2017/0186144 | A1* | 6/2017 | Chien ..................... G06T 5/002 |
| 2018/0236664 | A1 | 8/2018 | Ando |
| 2019/0005667 | A1 | 1/2019 | Khawaja |
| 2019/0026531 | A1* | 1/2019 | Alvarez Gonzalez ....................... G06K 9/6267 |
| 2019/0130641 | A1* | 5/2019 | Barajas Hernandez ..................... G06T 17/20 |
| 2019/0352110 | A1 | 11/2019 | Yuvaraj et al. |
| 2020/0063399 | A1* | 2/2020 | Miller ..................... E02F 3/437 |
| 2020/0074377 | A1* | 3/2020 | Tanigawa ......... G06Q 10/06398 |
| 2020/0134372 | A1* | 4/2020 | Roy Chowdhury . G05D 1/0088 |
| 2021/0188312 | A1* | 6/2021 | Shikari .............. G01C 21/3407 |

* cited by examiner

METHOD AND SYSTEM FOR DETECTING A PILE

TECHNICAL FIELD

The present disclosure relates generally to autonomous systems, and, more particularly, to a method and system for autonomously detecting a material pile.

BACKGROUND

In the construction and mining industry, autonomous machines, such as bulldozers, off-highway trucks, wheel loaders, and excavators, may be used. The ability to detect piles of material is an important functionality for autonomous systems of many different types of machines. For example, autonomous trucks need to be able to detect and localize piles so that they can plan a path and navigate towards a pile or around piles. Autonomous wheel loaders and excavators need to be able to detect piles so that they will know how to approach the pile and position the bucket to ensure the loading capacity of the bucket is maximized. Autonomous dozers need to detect piles in order to identify the pile to be spread.

Detecting piles is also important for obstacle detection and safety. If a travel path of an autonomous machine is through or over a pile, the machine may flip, slide or become stuck, which not only presents a safety concern, but also takes time and money to rectify the situation.

Further, it can be difficult for the remote operator or the automated system to accurately determine a degree of tool engagement with the pile during the loading segment of the excavation process. One attempt to improve efficiency in the loading segment via an autonomous method for detecting a pile is disclosed in U.S. Pat. No. 9,702,115 to Darakhanavala (the '115 patent). Specifically, the '115 patent discloses an autonomous method for detecting when an earthmoving machine has moved a pile of dirt into contact with another pile of dirt. The method includes receiving at a controller a plurality of signals indicative of one or more parameters including a ground speed of the machine, a target ground speed of the machine, a load on a work implement of the machine, an output speed of a torque converter of the machine, a machine pitch, a machine steering command, a machine heading, and a heading of a slot the machine is in. The controller standardizes and normalizes each signal from the plurality of signals in order to create values for each of the one or more parameters that all fall within a common range, wherein the common range is representative of a range from minimum to maximum values for each of the one or more parameters. The controller also determines a variation of each of the values for the one or more parameters over each of a plurality of time periods to calculate relative rates of change for the one or more parameters, weights each of the values for each of the one or more parameters as a function of the relative rates of change, adds up the weighted values of the parameters, and applies a sigmoid function to the weighted values of the parameters in order to limit the effect any one of the parameters has on an output indicative of behavior characteristic of the machine having pushed a pile of dirt into contact with another pile of dirt.

SUMMARY

According to some implementations, the present disclosure is related a method for detecting a pile of material by an autonomous machine. The method includes receiving, using a processor on the machine, a three-dimensional point cloud indicative of an environment having a pile of material, performing a ground surface estimation on the three-dimensional point cloud to identify non-ground points, grouping the non-ground points into one or more clusters of points based on the proximity of the points to each other, creating a normalized height histogram for each of the one or more clusters, comparing the normalized height histogram of each cluster to a generalized pile histogram, and identifying a cluster from the one or more clusters as a pile based on the similarity between the normalized height histogram of the cluster and the generalized pile histogram.

According to some implementations, the present disclosure is related to an autonomous vehicle having one or more traction devices connected to and supporting a frame, a power source mounted to the frame and configured to drive the traction devices, a 3D sensing device capable of generating a 3D point cloud indicative of an environment having a pile of material, and a processor. The processor being configured to receive a three-dimensional point cloud indicative of an environment having a pile of material, perform a ground surface estimation on the three-dimensional point cloud to identify non-ground points, group the non-ground points into one or more clusters of points based on the proximity of the points to each other, create a normalized height histogram for each of the one or more clusters, compare the normalized height histogram of each cluster to a generalized pile histogram, and identify a cluster from the one or more clusters as a pile based on the similarity between the normalized height histogram of the cluster and the generalized pile histogram.

According to some implementations, the present disclosure is related a method for detecting a pile of material by an autonomous machine that includes receiving from an imaging device, using a processor on the machine, a two-dimensional image of an environment having a pile of material, autonomously detecting an image of the material pile in the two-dimensional image using a deep-learning neural network stored in a memory on the machine and previously trained to detect an image of a material pile in a two-dimensional image, and calibrating the imaging device with respect to a coordinate frame of the machine to determine the distance of the pile of material from the machine.

DETAILED DESCRIPTION

Figure 1:
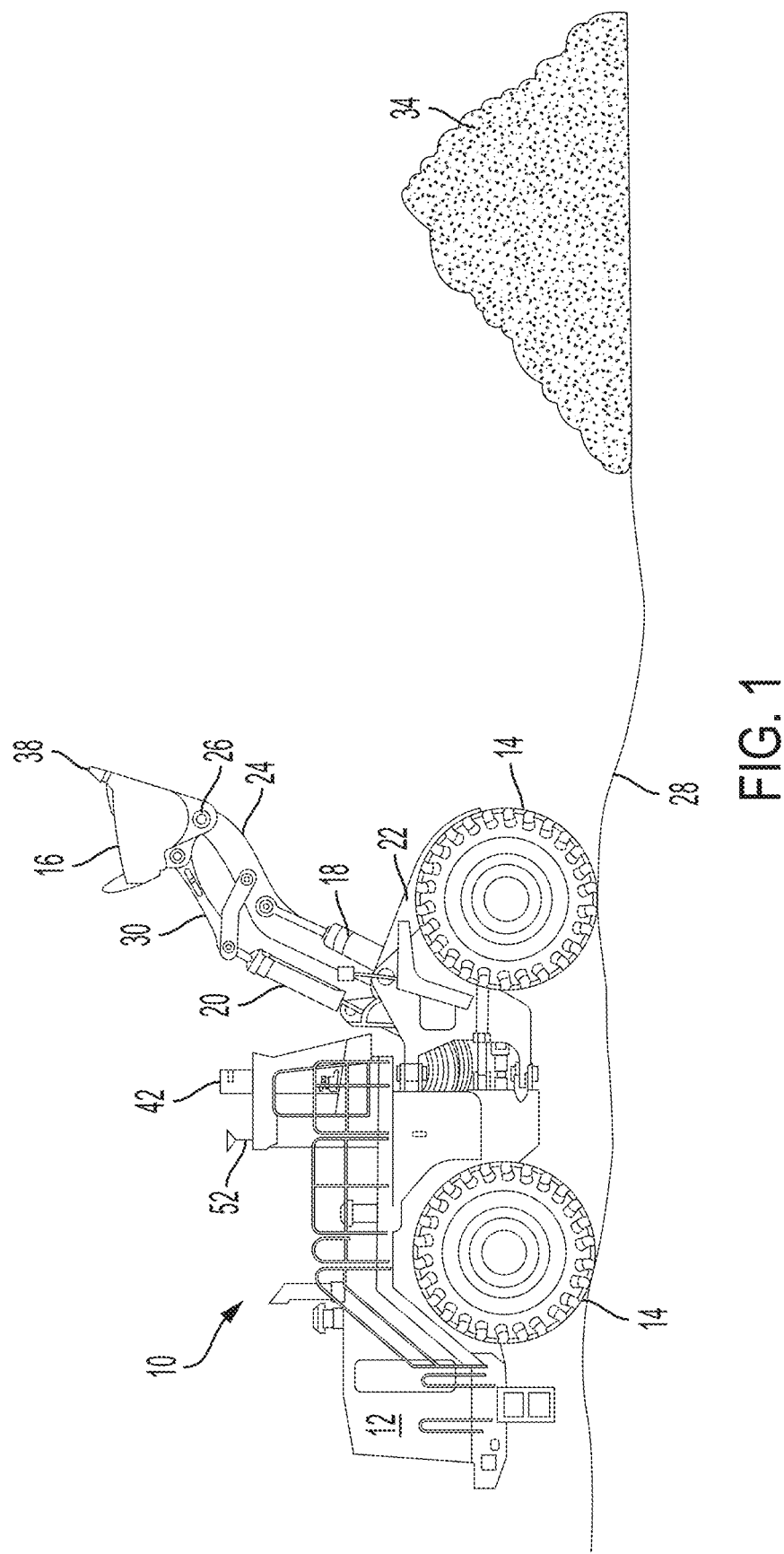
FIG. 1 is a side view of an exemplary machine.

FIG. 1 illustrates an exemplary embodiment of an autonomous machine 10. In the disclosed example, the autonomous machine 10 is a wheel loader. It is contemplated, however, that the autonomous machine 10 could be a variety of machines. For example, the autonomous machine 10 may be a machine used in the construction and/or mining industry, such as an excavator, a dozer, and an off-highway truck. Any autonomous machine that would benefit from the disclosed systems and methods for detecting a pile may be used.

The machine 10 may include, among other things, a power source 12, one or more traction devices 14 (e.g., wheels or tracks), a work tool 16, one or more lift actuators 18, and one or more tilt actuators 20. The lift actuators 18 and the tilt actuators 20 may connect the work tool 16 to a frame 22 of the machine 10. In one exemplary embodiment as illustrated in FIG. 1, the lift actuators 18 may have one end connected to the frame 22 and an opposite end connected to a structural member 24, which may be connected to the work tool 16.

The work tool 16 may be connected to the structural member 24 via a pivot pin 26. The lift actuators 18 may be configured to lift or raise the work tool 16 to a desired height above a ground surface 28. In one exemplary embodiment, as illustrated in FIG. 1, the tilt actuators 20 may have one end connected to the frame 22 and an opposite end connected to a linkage member 30, which may be connected to the work tool 16.

The power source 12 may be supported by the frame 22 of the machine 10 and may include an engine (not shown) configured to produce a rotational power output and a transmission (not shown) that converts the power output to a desired ratio of speed and torque. The rotational power output may be used to drive a pump (not shown) that supplies pressurized fluid to the lift actuators 18, the tilt actuators 20, and/or to one or more motors (not shown) associated with traction devices 14. The engine of the power source 12 may be a combustion engine configured to burn a mixture of fuel and air. The transmission of the power source 12 may take any form known in the art, for example a power shift configuration that provides multiple discrete operating ranges, a continuously variable configuration, or a hybrid configuration. The power source 12, in addition to driving the work tool 16, may also function to propel the machine 10, for example via one or more traction devices 14.

Numerous different work tools 16 may be operatively attachable to the machine 10 and driven by the power source 12. The work tool 16 may include any device used to perform a particular task such as, for example, a bucket, a fork arrangement, a blade, a shovel, or any other task-performing device known in the art. Although connected in the embodiment of FIG. 1 to lift and tilt relative to the machine 10, the work tool 16 may alternatively or additionally rotate, slide, swing open/close, or move in any other manner known in the art. The lift and tilt actuators 18, 20 may be extended or retracted to repetitively move work tool 16 during an excavation cycle.

In one exemplary embodiment, the machine 10 may be used to move or add to a material pile 34 and/or plot a path to or around the material pile 34. The material pile 34 may constitute a variety of different types of materials. For example, the material pile 34 may consist of loose sand, dirt, gravel, clay, rocks, mineral formations, etc. In the illustrated embodiment, the work tool 16 is a bucket having a tip 38 configured to penetrate the material pile 34.

Figure 2:
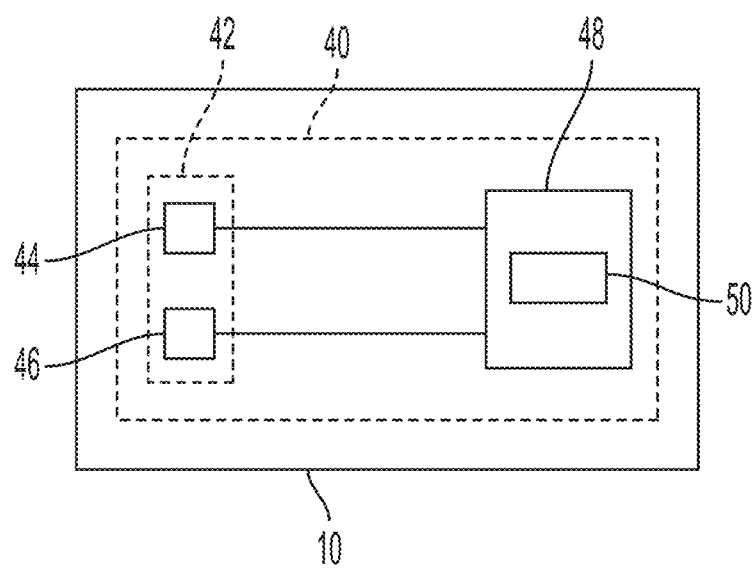
FIG. 2 is a schematic representation of an exemplary system for detecting piles of the machine of FIG. 1.

Referring to FIG. 2, the machine 10 includes a system 40 for autonomously detecting material piles 34. The system 40 includes one or more sensors 42 configured to provide a two-dimensional (2D) image of an environment having a pile of material 34 and/or a three-dimensional (3D) map space representation indicative of an environment having a pile of material 34. For example, as shown in FIG. 2, the machine 10 may include a 2D imaging device 44, such as a mono camera, thermal camera, video camera, stereo camera, or some other imaging device (e.g., an image sensor). The machine 10 may also include a 3D sensing device 46, such as for example, a LIDAR (light detection and ranging) device, a RADAR (radio detection and ranging) device, a SONAR (sound navigation and ranging) device, a stereo camera, or any other device capable of providing a 3D map space representation (i.e. a 3D point cloud) indicative of an environment having a material pile 34. The one or more sensors 42 may be any suitable device known in the art for creating a 2D image and/or a 3D map space representation, or other suitable output for use in detecting a pile.

The one or more sensors 42 may generate the image and/or a 3D map space representation of the material pile 34 and communicate the image and/or a 3D map space representation to an on-board processor 48 for subsequent conditioning. The one or more sensors 42 are communicatively coupled to the processor 48 in any suitable manner. The processor 48 may be configured in a variety of ways. The processor 48 may embody a single microprocessor or multiple microprocessors. The processor 48 may be dedicated to the function of pile detection or may provide additional functionality to the machine 10, such as an engine control module (ECM).

The system 40 also includes memory 50. The memory 50 may be integral to the processor 48 or remote but accessible by the processor 48. The memory 50 may be a read only memory (ROM) for storing a program(s), a neural network, or other information, a random access memory (RAM) which serves as a working memory area for use in executing the program(s) stored in the memory 50, or a combination thereof. The processor 48 may be configured to refer to information stored in the memory 50 and the memory 50 may be configured to store various information determined by the processor 48.

The machine 10 may also be outfitted with a communication device 52 (FIG. 1) that allows communication of the image and/or a 3D map space representation to an off-board entity or from an off-board entity. For example, the machine 10 may communicate with a remote-control operator and/or a central facility (not shown) via the communication device 52.

Figure 3:
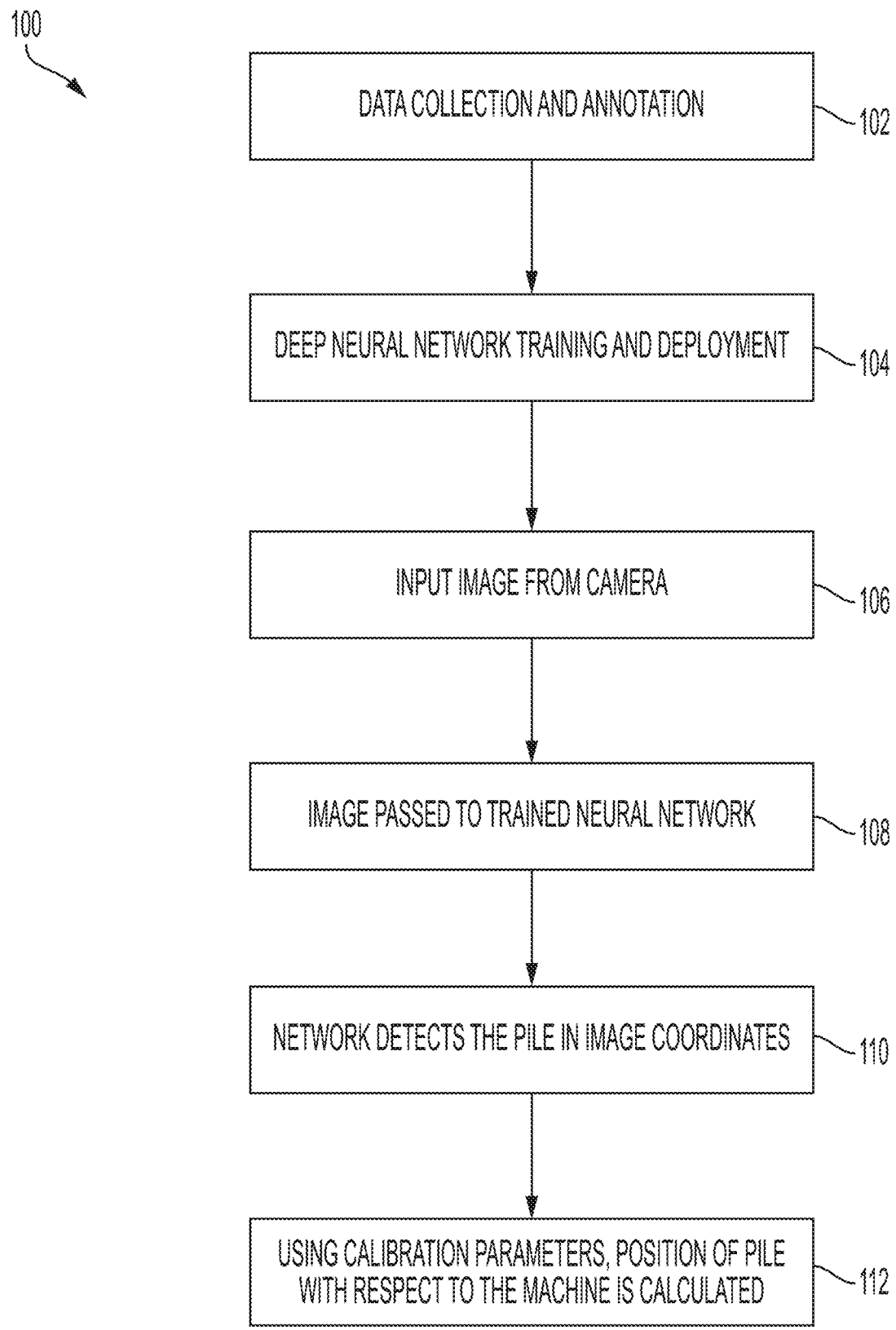
FIG. 3 is a flowchart of an exemplary method of detecting a pile.

FIG. 3 illustrates an exemplary method 100 used by the machine 10 for detecting the material pile 34. The method 100 uses a mono-camera(s) 44 or other imaging device(s) (e.g. Ethernet image sensor) capable of creating a 2D image and the processor 48 on the machine 10 with support to run a deep learning network for inference. The method 100 involves inputting 2D images into the deep learning neural network, which was trained to perform the task of pile detection. The method 100 includes the initial steps of collecting and annotating 2D image data 102 and then using the annotated image data to train a deep learning neural network 104. For the step of data collection and annotation 102, 2D images are obtained of a variety of piles. The mono-camera(s) or other imaging device(s) used to obtain the 2D images may be one or more of the sensors 42 on the machine 10, may be one or more cameras or other imaging devices independent of the machine 10, or a combination thereof. Preferably, the 2D images would include a variety of material piles of different shapes, sizes, and material types and the images may be obtained from a variety of construction and mining sites.

Referring to step 104, the 2D images obtained in step 102 are labelled using an annotation tool. Any suitable annotation tool or annotation technique known in the art for labelling portions of images may be used. FIG. 3 illustrates an example of an annotated image 120. The annotated image 120 includes a base ground surface 121, a first material pile 122, a second material pile 124, a person standing 126, and a boulder 128. The first material pile 122 is labeled by the annotation tool by surrounding it in a first bounded box 130. Likewise, the second material pile 124 is surrounded by a second bounded box 132. Thus, the bounded boxes 130, 132 identify those portions of the image 120 that are material piles.

Figure 4:
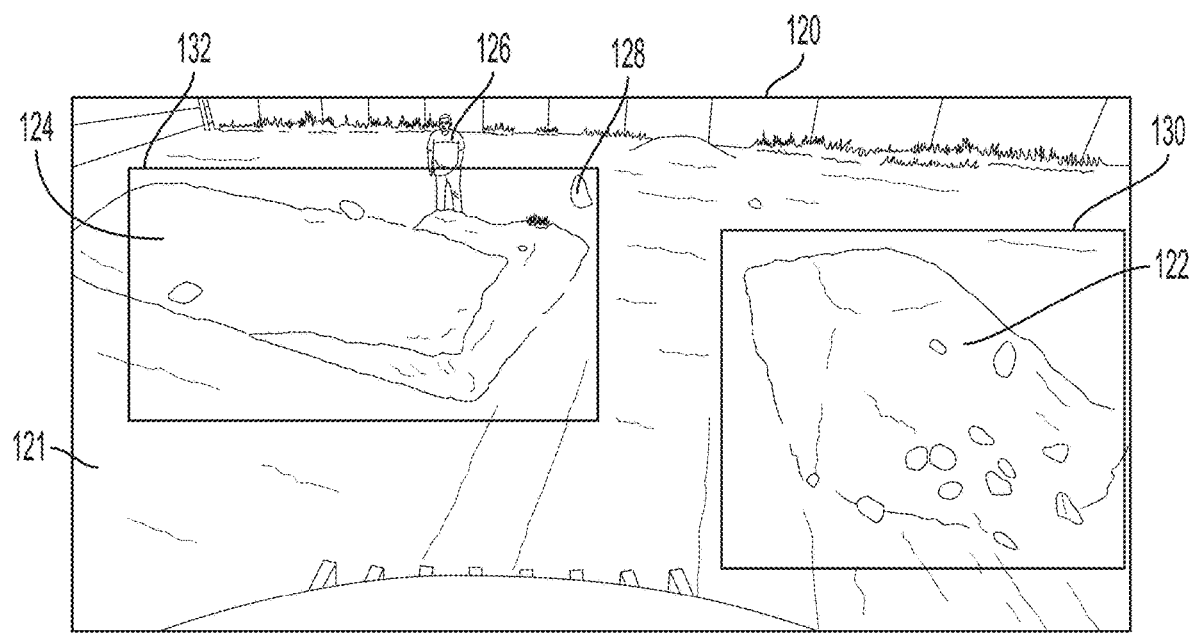
FIG. 4 is an illustration of an image of an environment having piles of material with the piles identified with bounding boxes.

FIG. 4 illustrates the annotated image 120 utilizing a different annotation method. As with FIG. 3, the annotated image 120 includes a base ground surface 121, a first material pile 122, a second material pile 124, a person standing 126, and a boulder 128. The first material pile 122 is labeled by the annotation tool by covering the portions of the image depicting the first material pile 122 with a first pixelwise segmentation mask 140. Likewise, the portions of the image depicting the second material pile 124 are covered with a second pixelwise segmentation mask 142. Thus, the pixelwise segmentation masks 140, 142 identify those portions of the image 120 that are material piles.

The variety of annotated images of the material piles, such as the annotated image 120, are then used to train a deep learning neural network to be able to recognize material piles in an image. Deep learning neural networks are known in the art. Any suitable deep learning neural network may be used. For example, if bounding box labelling is used, a network such as MobileNetSSD-V2 may be used. If pixelwise segmentation masks are used to label the material piles, a network such as SegNet may be used. Further, the methodology of how to train a deep learning neural network is also know in the art and is not discussed in detail.

Once the deep learning neural network has been trained, the trained network is deployed by porting it onto the processor 48. The processor 48 may be any processor capable of running the deep learning neural network. For example, the processor 48 may be an accelerated ECM that is FPGA based or GPU based.

An additional part of deployment includes calibration of the camera 44 or 2D imaging device on the machine 10 so that the distance between objects captured in the image and the machine can be determined or estimated. For example, the machine 10 may include an inertial measurement unit (IMU)(not shown) which can be used to define a coordinate frame of the machine 10. An extrinsic calibration of the camera 44 with respect to the coordinate frame of the machine 10 can be measured using a device such as a Universal Total Station.

With the neural network trained and ported onto the processor 48 and the camera 44 calibrated, the system 40 is configured to autonomously detect piles. In operation, in step 106, the camera 44 or 2D imaging device generates images and communicates the images to the processor 48. In step 108, the images are passed to the trained neural network in the processor 48. In step 110, the trained neural network examines each image received and detects whether a material pile 34 is shown in any given image frame.

Once a material pile 34 is detected in the image frame, the centroid (center) of the material pile 34 is calculated by averaging the position of all the pixels that belong to the material pile 34. The position can be transformed using the camera projection matrix and the extrinsic calibration, into the machine frame, so that the autonomy system would be able to know the position and location of the material pile 34, with respect to the machine 10.

Figure 6:
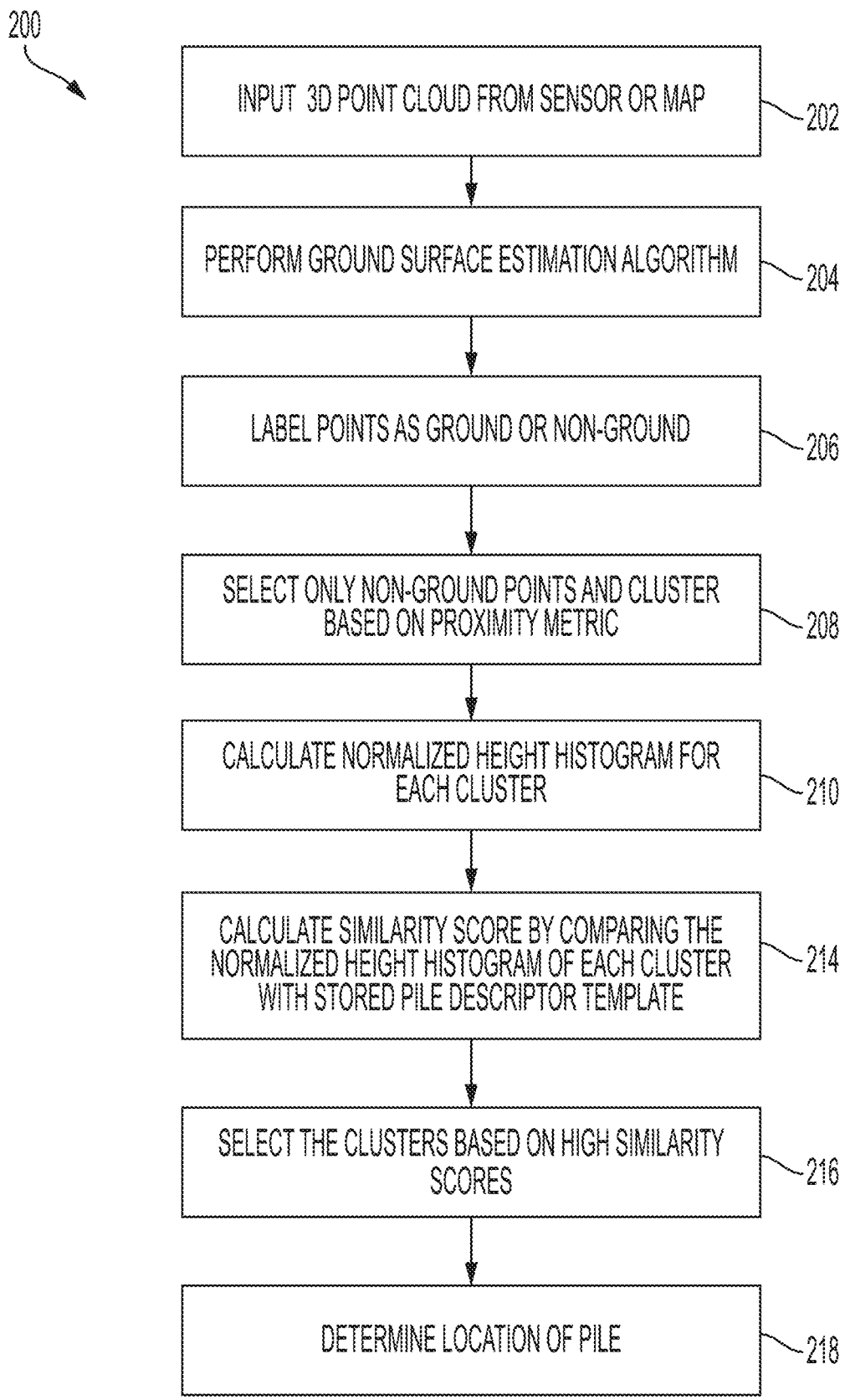
FIG. 6 is a flowchart of another exemplary method of detecting a pile.

FIG. 6 illustrates another exemplary method 200 used by the machine 10 for detecting the material pile 34. The method 100 uses a system including the 3D sensing device 46 and the processor 48 on the machine 10 with support to perform accelerated computing. The method 200 uses a geometric technique for detecting a pile based on a 3D point cloud. A 3D point cloud is a set of data points (XYZ coordinates) in space.

The method 200 includes inputting a 3D point cloud to the processor 48, at step 202. The 3D point cloud can come directly from the 3D sensing device 46, such as a stereo camera, LIDAR, etc. and/or can come from any type of 3D mapping space representation, such as an octmap or height map. The 3D mapping space representation may be generated remote from the machine 10 and uploaded to the processor 48, such as for example, from an off-board entity via the communication device 52

Figure 7:
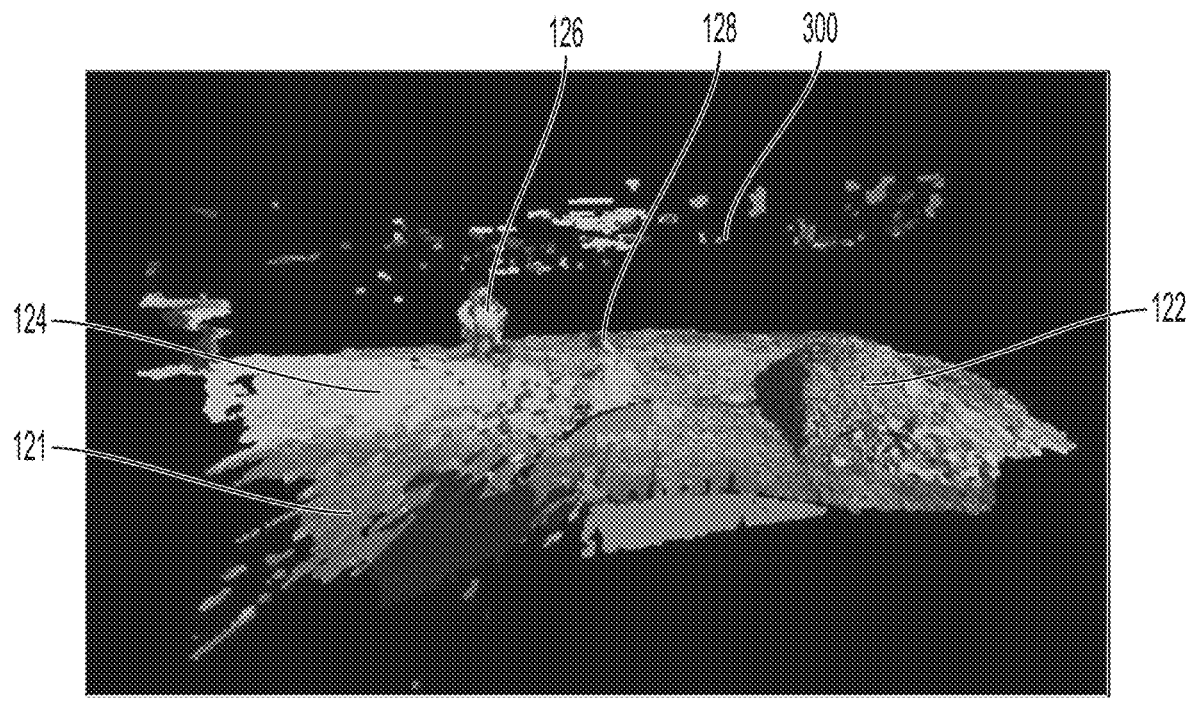
FIG. 7 is an illustration of a 3D point cloud indicative of an environment having a pile of material.

FIG. 7 illustrates an example of a 3D point cloud 300 of same scene as shown in annotated image 120. In particular, the 3D point cloud depicts the base ground surface 121, the first material pile 122, the second material pile 124, the person standing 126, and the boulder 128. Once a 3D point cloud is obtained, a ground surface estimation (GSE) can be performed on the 3D point cloud, at step 204. GSE is known in the art. Any suitable GSE technique or algorithm may be used. Generally, a GSE algorithm identifies and extracts the major ground surface from a 3D point cloud via a series of mathematical and geometric calculations such as normal calculation, unevenness estimation, plane fitting, and random sampling consensus (RANSAC).

Figure 8:
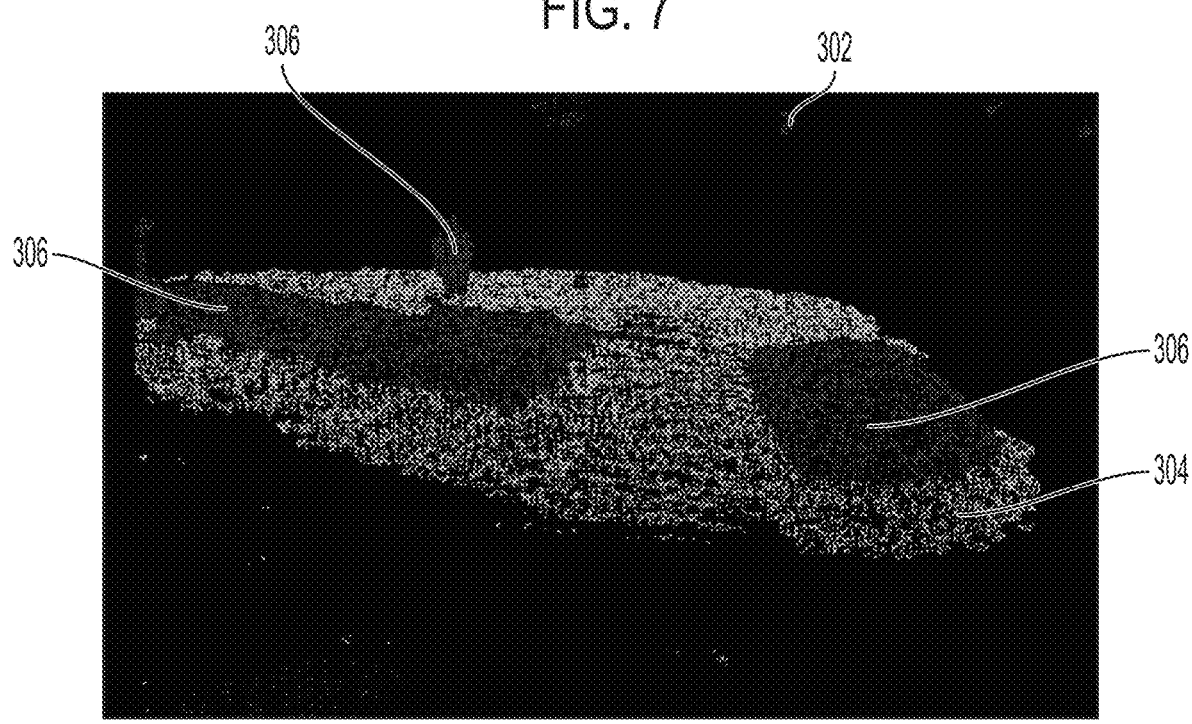
FIG. 8 is an illustration of the output of a ground surface estimation algorithm on the 3D point cloud of FIG. 7.

In step 206, the output of the GSE assigns a label to the points which are considered ground and a different label to the points which are considered non-ground (i.e., everything above or below the ground surface). FIG. 8 is an example of the output of the GSE 302 for the 3D point cloud of FIG. 7. In FIG. 8, the ground points 304 are shown in a lighter shade or color, while the non-ground points 306 are shown in a darker shade or color.

In step 208, with each point classified as ground and non-ground, only the non-ground points are selected for further processing. The non-ground points are then grouped into clusters based on a point-to-point proximity metric (i.e., non-ground points in close proximity to each other are grouped as part of the same cluster). Clustering algorithms based on a proximity metric are known in the art. Any suitable clustering algorithm may be used to group the non-ground points into clusters.

In step 210, for each cluster, the processor 48 calculates a histogram of the normalized height of the points from the ground surface. For example, the lowest point in the cluster is assigned a value of zero and the highest point in the cluster is assigned a value of 1. All the points with heights between the highest and lowest point are assigned numeric values between zero and 1 in proportion to their height relative to the highest and lowest points. A histogram of the normalized height data is then created.

In step 212, the processor 48 compares the histogram to a pile descriptor template that has been previously created and is accessible by the processor 48. Regarding the pile descriptor template, material piles generally have a similar shape regardless of the type of material. Therefore, the normalized height histogram of one material pile is generally similar to the normalized height histogram of other material piles. As such, a generalized normalized histogram of a material pile is created from previous data collected on other piles and made available to the processor 48. The generalized pile histogram is used as a representation of most piles (i.e., a pile descriptor template). In some embodiments, multiple generalized pile histograms can be created and each can be compared to the histogram of the normalized height of the points from the ground surface for each cluster.

As the output of the comparison of the histogram of the normalized height of the points from the ground surface for each cluster to the pile descriptor template, the processor 48 calculates a similarity score. A similarity score is a way to represent how confident the algorithm is that the normalized height histogram matches the descriptor template. For example, a similarity score may be a numerical value indicating how well the normalized histogram matches the pile descriptor template. In one example, the similarity score can be a value between 0 to 100, where 0 represents not matching at all, while 100 represents a perfect match. Calculating a similarity score between data sets is known in the art. Any suitable methodology for calculating a similarity score between the histogram of the normalized height of the points from the ground surface for each cluster and the pile descriptor template may be used.

In step 214, the processor 48 identifies the clusters with the highest similarity scores and treats those clusters as being material piles. In some embodiments, a similarity score threshold may be set and the processor compares the similarity score of each cluster with the similarity score threshold. Any cluster having a similarity score at or greater than threshold is considered by the processor 48 to be a material pile.

In step 216, for the clusters identified as being material piles, the location of the material pile 34 is determined. The location of the piles may be determined in any suitable manner. For example, the centroid (center) of the pile can be calculated and then transformed, if needed, into the machine or world frame. For example, for 3D cloud point data, each of the points has 3D cartesian coordinates (x,y,z) in space that allow the location of these points to be readily identified. Depending on which coordinate frame the 3D point data is in, a transformation to the world frame or machine frame may be needed. If the 3D point data is in the world frame or machine frame, no transformation would need to be done to allow the location of the piles to be determined. If, however, the 3D point data is in the sensing device frame, then an extrinsic calibration with respect to the coordinate frame of the machine 10 can be measured using a device such as a Universal Total Station.

In some embodiments, the machine 10 may utilize a combination or fusion of both the method 100 which involves inputting 2D images into the deep learning neural network trained to perform the task of pile detection and the method 200 which uses a geometric technique for detecting a pile based on a 3D point cloud. For example, the one or more sensors 42 one the machine 10 may include both a camera 44 or some other 2D imaging device and a 3D sensing device 46, such as LIDAR or a stereo camera. If the 3D sensing device 46 is a stereo camera, it automatically proves the 3D point cloud and the 2D image as one message and can be used for both methods.

Combining the use of the method 100 and the method 200 to detect piles may be done in a variety of ways. For example, in one embodiment, each detection method 100, 200 is run independently with any material piles detected by either method being treated as a pile by the machine 10. In another embodiment, each detection method 100, 200 is assigned a confidence weighting and the output of the two methods 100, 200 are fused. In yet another embodiment, any pile detected in the method 200 can be projected back into the image, and the two predictions can be fused to improve the prediction accuracy. For example, the different pile detection methods 100, 200 may use different sensors (e.g., a mono camera and a LIDAR), and thus, may provide detected piles in the respective sensor coordinate frame. A coordinate transformation to the pile detected in one image sensor (e.g. a 3D image sensor) can be performed to place the points onto the image frame of the 2D imaging device. In this way the pile detected by the 3D sensing device is overlaid on the pile detected by the 2D imaging device and it can be determined, using methods known in the art, that the two sensors are detecting the same pile.

INDUSTRIAL APPLICABILITY

Figure 5:
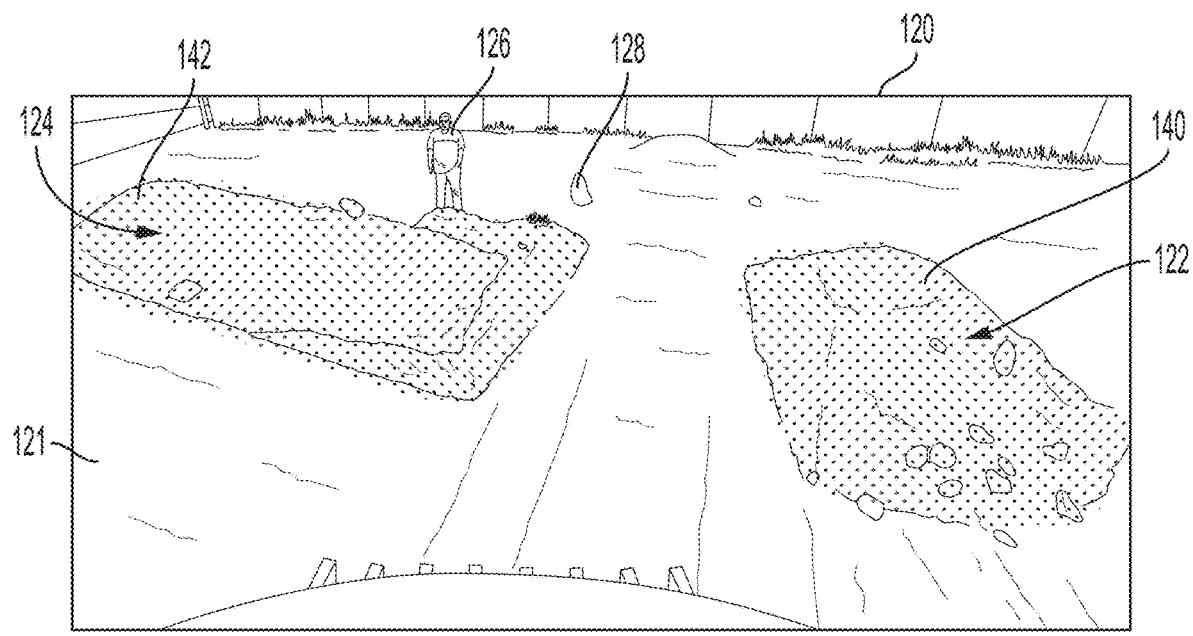
FIG. 5 is an illustration of an image of an environment having piles of material with the piles identified with pixelwise segmentation masks.

The systems and methods for detecting piles may be used on any autonomous machine, such as a wheel loader, an excavator, an off-highway truck, and a dozer, that may encounter material piles. Many autonomous systems currently utilize both a camera and a 3D sensing device, such as LIDAR. The disclosed systems and methods provide an effective way to detect materials piles using the sensors already on most autonomous systems along with a processor 48 on the machine 10 capable of performing the accelerated computing required for utilizing the geometric technique for detecting a pile based on a 3D point cloud of the method 200 of FIG. 5 and for running the trained neural network and image comparison of the method 100 of FIG. 2.

In addition to the core functionality of pile detection needed to be able to plan a path and navigate towards, or around, a material pile, and to approach a material pile and position a work tool optimally, the pile detection methods disclosed also provide benefits to productivity measurement and monitoring. Site supervisors are interested in knowing how much material the pile contains and how much material has been moved from the pile. Traditional methods involve hand and paper calculations and estimates. There is a desire, however, to have perception systems automatically calculate the volume of piles and the amount of material moved. Before these metrics can be calculated, the pile must first be automatically detected.

While the system is illustrated as implemented on an autonomous wheel loader, it may be used on other types of machines, autonomous or not. Unless otherwise indicated herein, all sub-embodiments and optional embodiments are respective sub-embodiments and optional embodiments to all embodiments described herein. While the present disclosure has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the present disclosure, in its broader aspects, is not limited to the specific details, the representative compositions or formulations, and illustrative examples shown and described. Accordingly, departures may be made from such details without departing from the spirit or scope of Applicant's general disclosure herein.

What is claimed is:

1. A method for detecting a pile of material by an autonomous machine, the method comprising:
 receiving, using a processor on the machine, a three-dimensional point cloud indicative of an environment having a pile of material;

performing a ground surface estimation on the three-dimensional point cloud to identify non-ground points;
grouping the non-ground points into one or more clusters of points based on a proximity of the points to each other;
creating a normalized height histogram for each of the one or more clusters;
comparing the normalized height histogram of each cluster to a generalized pile histogram; and
identifying a cluster from the one or more clusters as a pile of material based on a similarity between the normalized height histogram of the cluster and the generalized pile histogram.

2. The method of claim 1, further comprising calculating a centroid of the cluster identified as a pile from three-dimensional coordinates of the non-ground points in the cluster.

3. The method of claim 1, wherein the three-dimensional point cloud is received from a LIDAR or stereo camera on the autonomous machine.

4. The method of claim 1, wherein the three-dimensional point cloud is generated remote from the machine and uploaded to the machine from an off-board entity via a communication device on the machine.

5. The method of claim 1, wherein identifying a cluster from the one or more clusters as a pile based on the similarity between the normalized height histogram of the cluster and the generalized pile histogram further comprises calculating a similarity score between the normalized height histogram of the cluster and the generalized pile histogram and identifying the cluster as a pile if the similarity score is equal to or exceeds a similarity score threshold.

6. The method of claim 1 wherein the generalized pile histogram is a normalized height histogram of three-dimensional point cloud data from one or more reference material piles, wherein the generalized pile histogram is stored in a memory accessible by the processor.

7. The method of claim 1, further comprising:
receiving from an imaging device, using a processor on the machine, a two-dimensional image of the environment having the pile of material;
autonomously detecting an image of the pile of material in the two-dimensional image using a deep-learning neural network stored in a memory on the machine and previously trained to detect an image of a material pile in a two-dimensional image; and
calibrating the imaging device with respect to a coordinate frame of the machine to determine a distance of the pile of material from the machine.

8. The method of claim 7, further comprising assigning a first confidence rating to any material pile detected from the three-dimensional point cloud and assigning a second confidence rating to any material pile detected by the deep-learning neural network.

9. The method of claim 7, wherein the deep-learning neural network is trained to detect an image of a material pile in a two-dimensional image by providing the deep-learning neural network with a plurality of two-dimensional images that include an image of one or more material piles that has been labeled.

10. An autonomous machine, comprising:
one or more traction devices connected to and supporting a frame;
a power source mounted to the frame and configured to drive the traction devices;
a three-dimensional sensing device capable of generating a three-dimensional point cloud indicative of an environment having a pile of material; and
a processor configured to:
receive the three-dimensional point cloud from the three-dimensional sensing device;
perform a ground surface estimation on the three-dimensional point cloud to identify non-ground points;
group the non-ground points into one or more clusters of points based on a proximity of the points to each other;
create a normalized height histogram for each of the one or more clusters;
compare the normalized height histogram of each cluster with a reference histogram; and
identify a cluster from the one or more clusters as a pile based on a similarity between the normalized height histogram of the cluster and the reference histogram.

11. The autonomous machine of claim 10, wherein the three-dimensional sensing device is a LIDAR or stereo camera.

12. The autonomous machine of claim 10, wherein the processor is further configured to calculate a centroid of the cluster identified as a pile from three-dimensional coordinates of the non-ground points in the cluster.

13. The autonomous machine of claim 10, wherein identifying a cluster from the one or more clusters as a pile based on the similarity between the normalized height histogram of the cluster and the generalized pile histogram further comprises calculating a similarity score between the normalized height histogram of the cluster and the generalized pile histogram and identifying the cluster as a pile if the similarity score is equal to or exceeds a similarity score threshold.

14. The autonomous machine of claim 10, wherein the generalized pile histogram is a normalized height histogram of three-dimensional point cloud data from one or more reference material piles, wherein the generalized pile histogram is stored in a memory accessible by the processor.

15. The autonomous machine of claim 10, wherein the processor is further configured to:
receive from an imaging device, using a processor on the machine, a two-dimensional image of an environment having the pile of material;
autonomously detect the image of the material pile in the two-dimensional image using a deep-learning neural network stored in a memory on the machine and previously trained to detect an image of a material pile in a two-dimensional image; and
calibrate the imaging device with respect to a coordinate frame of the machine to determine a distance of the pile of material from the machine.

16. The autonomous machine of claim 15, wherein the processor is further configured to assign a first confidence rating to pile of material detected from the three-dimensional point cloud and assign a second confidence rating to any pile of material detected by the deep-learning neural network.

17. A method for detecting a pile of material by an autonomous machine, comprising:
receiving, using a processor on the machine, a three-dimensional point cloud indicative of an environment having a pile of material, wherein the three-dimensional point cloud is obtained from a three-dimensional sensing device positioned on the machine;

performing a ground surface estimation on the three-dimensional point cloud to identify non-ground points;

grouping the non-ground points into one or more clusters of points based on a proximity of the points to each other;

identifying a cluster from the one or more clusters as the pile of material;

receiving from an imaging device, using a processor on the machine, a two-dimensional image of the environment having the pile of material;

autonomously detecting the image of the pile of material in the two-dimensional image using a deep-learning neural network stored in a memory and previously trained to detect an image of the pile of material in a two-dimensional image; and calibrating the imaging device with respect to a coordinate frame of the machine to determine a distance of the pile of material from the machine.

18. The method of claim 17, wherein the imaging device is one of a mono-camera, a stereo camera, or a video camera.

19. The method of claim 17, wherein the deep-learning neural network is trained to detect the image of the pile of material in a two-dimensional image by providing the deep-learning neural network with a plurality of two-dimensional images that include an image of one or more piles of material that has been labeled.

20. The method of claim 19 wherein the image of one or more piles of material is labeled by a bounded box or pixelwise segmentation mask.

* * * * *